United States Patent [19]
Kujawski

[11] Patent Number: 5,703,330
[45] Date of Patent: Dec. 30, 1997

[54] WIRE HARNESS CONDUIT AND TUBE BUNDLE

[75] Inventor: Rick A. Kujawski, Mount Clemens, Mich.

[73] Assignee: Bundy Corporation, Warren, Mich.

[21] Appl. No.: 976,524

[22] Filed: Nov. 16, 1992

[51] Int. Cl.⁶ .................................................... F16L 3/22
[52] U.S. Cl. ................... 174/72 A; 24/339; 24/459; 138/157; 248/68.1; 403/344
[58] Field of Search ................ 174/72 A, 72 R, 174/88 S, 97, 99 R, 68.3; 29/453; 403/344; 248/68.1, 74.4; 24/339, 459, 336; 138/157, 163, 103, 106, 111, 112

[56] References Cited

U.S. PATENT DOCUMENTS

| | | | |
|---|---|---|---|
| 814,217 | 3/1906 | Knight et al. | 138/151 X |
| 1,330,811 | 2/1920 | Konigslow | 174/72 A |
| 2,814,787 | 11/1957 | Jessup | 29/453 X |
| 3,055,399 | 9/1962 | Bush et al. | 29/453 X |
| 3,420,032 | 1/1969 | Felt | 29/453 X |
| 4,864,697 | 9/1989 | Sparks et al. | 248/68.1 |
| 5,046,464 | 9/1991 | Histatomi et al. | 174/72 A X |
| 5,243,138 | 9/1993 | Guthke et al. | 174/99 R X |

FOREIGN PATENT DOCUMENTS

| | | | |
|---|---|---|---|
| 2247052 | 6/1975 | France | 174/72 A |
| 213995 | 3/1961 | Germany | 174/72 A |
| 8700256 | 1/1987 | WIPO | 248/68.1 |

*Primary Examiner*—Joseph M. Gorski
*Attorney, Agent, or Firm*—Barnes, Kisselle, Raisch, Choate, Whittemore & Hulbert

[57] ABSTRACT

A carrier for a wire harness and fuel brake, or other tubes of a vehicle with inner and outer channels each having a generally C-shape cross section and constructed to releasably snap together to form a duct in which the wire harness is received. Snap clips on the exterior of the channels releasably retain the tubes. The carrier bundles the wire harness and tubes together and provides a self-supporting assembly for the flexible wire harness which facilitates installation and assembly to the underbody of a vehicle.

9 Claims, 1 Drawing Sheet

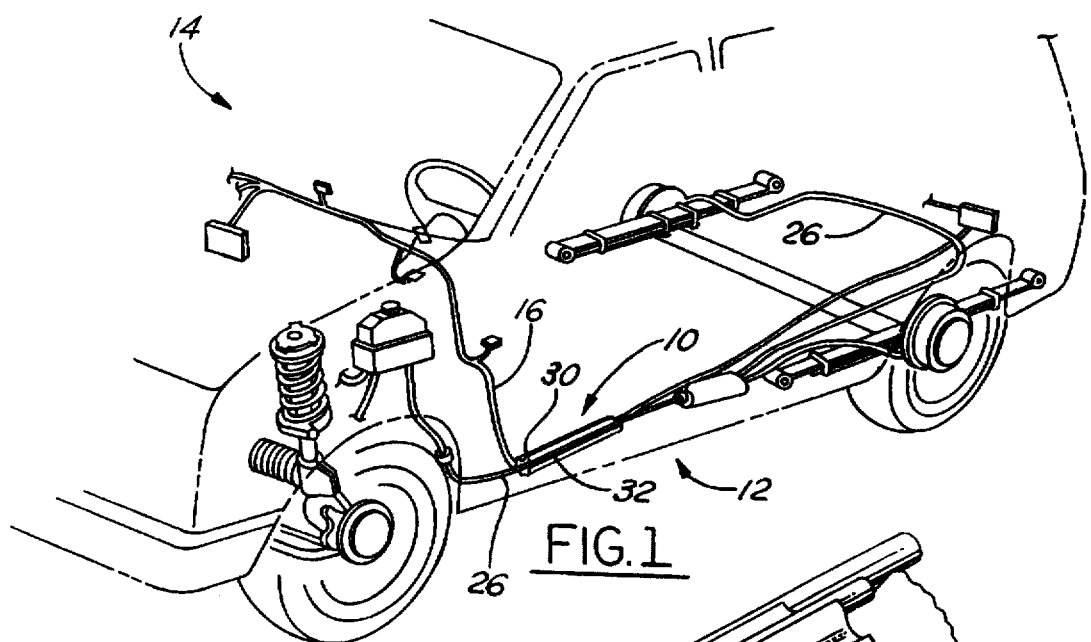
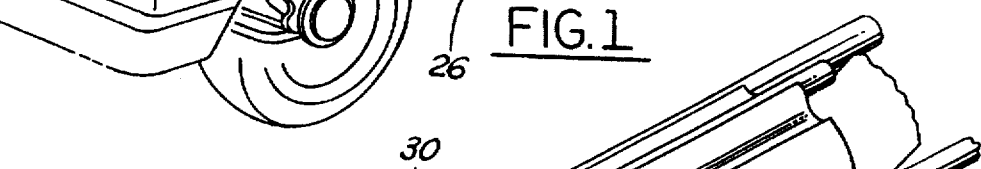
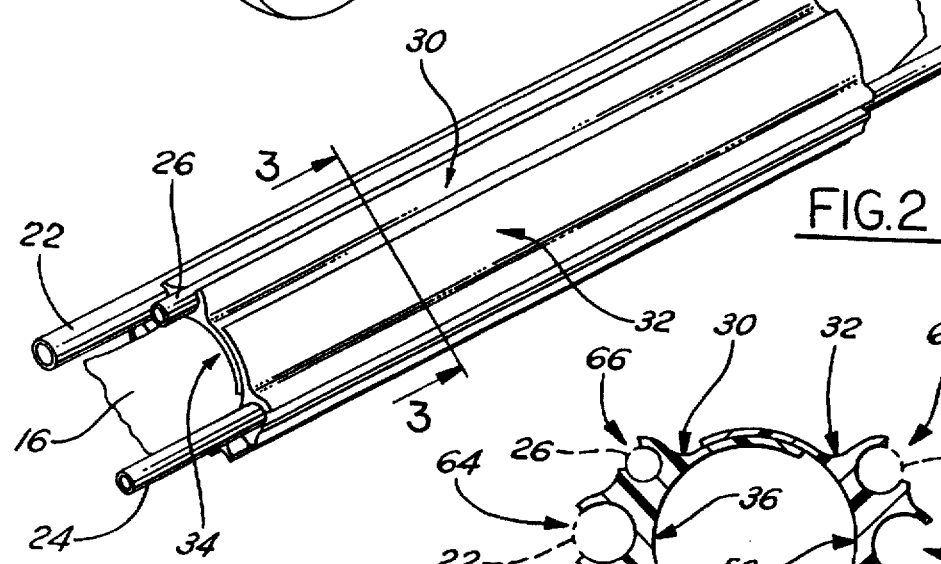
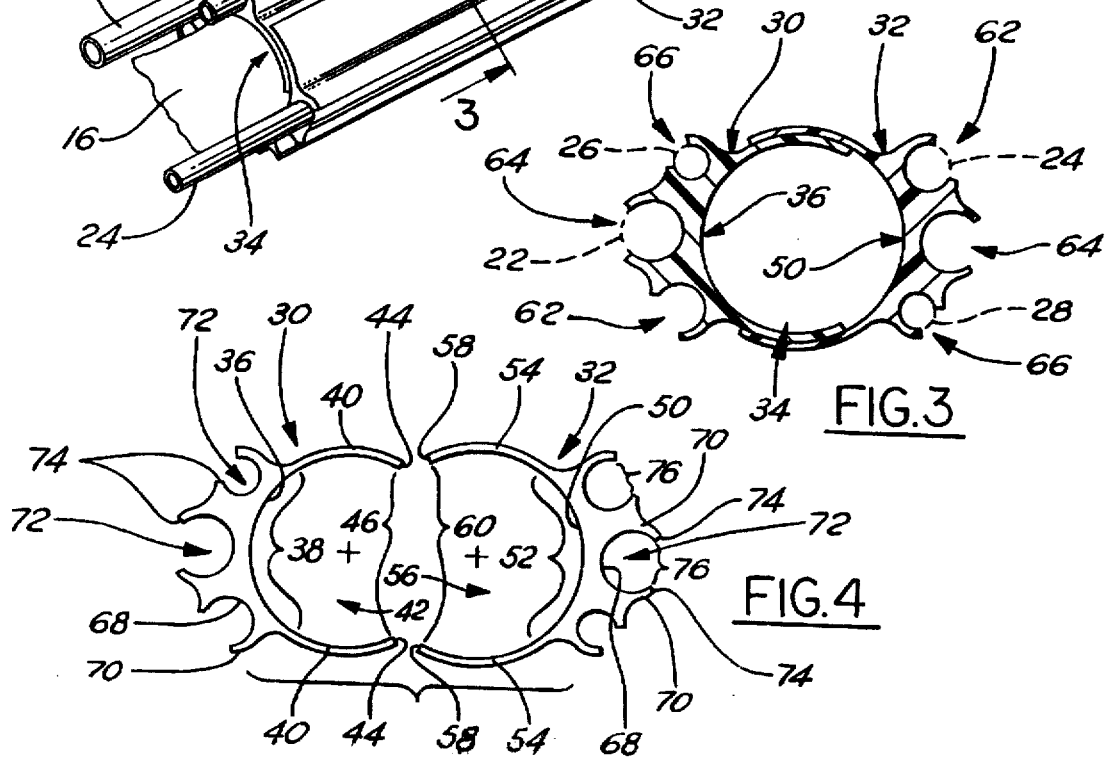

5,703,330

WIRE HARNESS CONDUIT AND TUBE BUNDLE

FIELD OF THE INVENTION

This invention relates to automotive wire harnesses and underbody fuel and brake tubes, and more particularly to a wire harness conduit and tube bundle carrier.

BACKGROUND

One previously known way of retaining a flexible wire harness within a rigid casing utilizes a slit tubular conduit with circumferentially overlapping portions which must be pried open and requires forceable insertion of the harness therein. In practice, this technique proves difficult, especially with long sections of conduit.

SUMMARY

Pursuant to this invention a carrier with two interlocking channel members provides a wire harness conduit which is easy to assemble and also bundles and carries fuel and brake tubes adjacent the conduit. The wire harness is received in an inner elongate and open channel. To provide a conduit encircling the wire harness, the inner channel is releasably engaged within a complementary outer elongate and open channel. Preferably, each channel has a generally C-shaped cross section. The fuel and brake lines are attached by elongate clips on exposed portions of the outer periphery of one or both channels and preferably integral with its associated channel.

In use, the carrier encases a flexible wire harness to form a generally rigid conduit, thereby facilitating handling and assembly of wire harness segments to a vehicle underbody. Additionally, retention of fuel and brake tubes along the carrier further facilitates their handling, assembly and routing along the underbody of an automobile and stiffens the carrier assembly.

Objects, features and advantages of this invention are to provide a combined wire harness conduit and tube carrier, a carrier which is easy to assemble about a wire harness, retains, locates and bundles fuel and brake tubes, facilitates handling and installation of the harness and tubes and their assembly to the underbody of an automobile, and is of simple and economical design, manufacture and assembly and in use facilitates any necessary removal, repair and replacement of the wire harness and tubes.

BRIEF DESCRIPTION OF THE DRAWINGS

These and other objects, features and advantages of this invention will be apparent from the following detailed description of the best mode, appended claims and the accompanying drawing in which:

FIG. 1 is a perspective partial view of a vehicle with a wire harness and fuel and brake tubes received in a carrier of the present invention and disposed generally longitudinally adjacent the underbody of a vehicle.

FIG. 2 is an enlarged fragmentary perspective view of the carrier of the present invention carrying several tubes and the wire harness.

FIG. 3 is a sectional view taken generally on line 3—3 of FIG. 2 with the wire harness removed.

FIG. 4 is a sectional view similar to FIG. 3, with the channels disposed in opposed relation prior to assembly.

DETAILED DESCRIPTION OF THE INVENTION

Referring in more detail to the drawing, FIG. 1 illustrates a carrier 10 embodying this invention which is mounted on the underbody 12 of an automotive vehicle 14 and carries a wire harness 16, fuel supply line 22, fuel return line 24, and hydraulic brake lines 26 & 28. The carrier has a pair of complementary inner and outer channels 30 and 32 which snap together and in assembly receive the wire harness therein and the tubes on the exterior thereof.

As shown in FIGS. 2 and 3, in assembly the channels define an enclosed conduit or duct 34 in which the wire harness is received. The assembled carriers provide a relatively stiff or self-supporting carrier for the flexible wire harness which facilitates handling and installing the harness on a vehicle underbody and provides protection of the harness from abrasion and wear encountered during use of the vehicle. Preferably, each channel is a unitary or homogenously integral one-piece member and may be made of a synthetic resin or plastic material, such as by extruding it in the desired cross sectional configuration.

The inner channel 32 has a side wall 36 which in cross section has a generally C-shape with a central or bight portion 38, and integral legs 40 which define a raceway 42 for receiving the wiring harness. The legs terminate in spaced apart free edges 44 which define between them a longitudinally extending opening 46 through which a wiring harness may be inserted laterally into the raceway 42.

The outer channel 32 has a sidewall 50 which in cross section has a generally C-shape with a central portion 52 and legs 54 extending therefrom which define a raceway 56 in which the legs 40 of the inner channel are received in assembly. The legs 54 terminate in spaced apart free edges 58 which define between them a longitudinally extending opening 60 through which the legs 40 of the inner channel can be laterally inserted into the raceway 56.

At least one, and preferably both of the channels are sufficiently resilient so that they can be shaped together in assembled relationship and separated or disassembled without permanently deforming either channel. To insure that when snapped together the channels are retained in assembled relation, the C-shape cross section of the outer channel, and preferably both channels, subtends an arc of more than a semi-circle or more than 180°.

To retain the tubes, at least one, and preferably both channels have clips 62, 64 & 66 on the exterior thereof. Since each clip has the same construction and elements and merely varies in the diameter of the tube it will retain, the same reference number will be used for the same element of all the clips even though it may vary somewhat in size. Preferably the clips are in the central portion of the channel wall, and extend longitudinally the length of the channel. Preferably, each clip has in cross section a generally C-shape with a central portion 68 and adjoining legs 70 which define a raceway 72 for receiving and releasably retaining a tube. Preferably, to insure retention of a tube, the wall and raceway of each clip subtends more than a semi-circle or 180°. The free edges 74 of the legs are spaced apart to define a longitudinally extending opening 76 through which a tube may be laterally inserted into and removed from the raceway. Each clip, and preferably its legs, are sufficiently resilient so that a tube can be inserted into and removed from the clip without permanently deforming the clip. As illustrated in the drawing, the raceways of the clips may be different diameters to accommodate tubes of a variety of different sizes.

To assemble the tubes and wire harness with the carrier 10, a flexible wire harness 16 preferably is inserted transversely or sideways through the opening between the legs and into the raceway 42 of the inner channel 30. The outer channel 32 and the inner channel 30 (with the harness therein) are disposed, as shown in FIG. 4, in generally opposed parallel relationship and then forced or pinched together so that the legs of the inner channel pass through the opening 60 in the outer channel and snap into the raceway 56 of the outer channel, as shown in FIG. 3, and into overlapping complementary engagement with the legs of the outer channel. The inner channel tends to snap into the outer channel and is releasably retained therein due to the resilient nature of the channels and the contour of their legs. This snap action is provided by the resilient channels when the free edges of the legs of the outer channel slide over the maximum outside diameter or widest portion of the legs of the inner channel.

Usually, it is preferable to install the tubes 22, 24 & 26 in the clips after the channels have been assembled together although the tubes can be installed before assembly of the channels. A tube is installed in a clip by disposing it generally parallel to and in engagement with the free edges of the legs of the clip and then forcing or pinching it through the opening between the legs and into the raceway of the clip. These tubes tend to snap into the clip when the free edges of its legs pass beyond the maximum diameter or width of the tube and releasably retain the tube therein due to the resilient nature of the clip and shape of the legs.

After the wire harness and tubes are assembled with the carrier, the entire subassembly is installed on the underbody of an automotive vehicle. The carrier facilitates installation of the wire harness and tubes both by bundling them together and by providing a relatively rigid or self-supporting carrier conduit for the flexible wire harness which does not collapse or buckle under its own weight. The carrier also generally orients the wire harness and tubes for assembly to associated components of the vehicle. When installed on the vehicle, the carrier also provides a protective shield for the wire harness and retains both the tube and wire harness in the desired location on the underbody. The carrier also permits the wire harness and tubes to be readily removed in the field as needed for any service or replacement.

I claim:

1. A carrier for at least one tube and a flexible wire harness of a vehicle comprising:

an elongate inner channel having in cross section a generally C-shape configuration with a central portion interconnecting a pair of legs terminating in spaced apart free edges forming a longitudinally extending raceway therein opening transversely to the exterior thereof and constructed and arranged to receive through its opening and in the raceway a portion of a flexible wire harness extending longitudinally therein, an elongate outer channel having in cross section a generally C-shape configuration with a central portion interconnecting a pair of legs terminating in spaced apart free edges forming a complementary raceway extending longitudinally therein, opening transversely to the exterior thereof, and constructed and arranged to receive through its opening and in its raceway a complementary portion of said legs of said inner channel so that in assembly said channels collectively encircle and enclose a portion of the wire harness, each of said channels subtends more than a semicircle and is at least somewhat resilient and in assembly said legs of said inner channel underlap and snap into complementarily engagement with said legs of said outer channel, and at least one tube retainer clip on the exterior of and carried by said inner channel on the central portion thereof, said clip being at least somewhat resilient, extending longitudinally of said inner channel, having therein a longitudinally extending raceway opening transversely to the exterior thereof and in cross section subtends more than a semicircle and is constructed and arranged to releasably receive and retain a tube of a vehicle, and when said channels are in assembly said retainer clip is received between said free edges of said legs of said outer channel and projects outwardly thereof.

2. The carrier of claim 1 wherein in cross section the outer periphery of said inner channel is generally smaller than and complementary to the outer periphery of said outer channel.

3. The carrier of claim 1 wherein each of said channels is an extrusion.

4. The carrier of claim 1 wherein each of said channels is a one piece body of a synthetic resin.

5. The carrier of claim 4 which also comprises at least two of said clips each received on the exterior of and carried by one of said inner and outer channels.

6. The carrier of claim 1 wherein each of said channels is of aluminum.

7. The carrier of claim 1 which comprises at least two of said clips each received on the exterior of and carried by one of said inner and outer channels.

8. The carrier of claim 1 wherein said retainer clip extends longitudinally substantially the entire longitudinal extent of said one channel.

9. The carrier of claim 1 wherein each of said channels is sufficiently resilient so that they can be snapped together in assembled relationship and disassembled without permanently deforming either channel.

* * * * *